Patented Sept. 3, 1935

2,013,313

UNITED STATES PATENT OFFICE

2,013,313

PURIFICATION OF GASES

Jesse G. Melendy, Tarrytown, N. Y., assignor to General Chemical Company, New York, N. Y., a corporation of New York No Drawing. Application July 9, 1931, Serial No. 549,806

4 Claims. (Cl. 23—178)

This invention relates to a method for the purification of burner gases such as are produced from sulfur or sulfide ores and other materials employed as a source of sulfur in the manufacture of sulfuric acid. The invention is directed especially to a purification process which will render sulfurous gases suitable for the manufacture of sulfuric anhydride and sulfuric acid by the so-called contact process in which the sulfur dioxide content in such gases is caused to combine with oxygen by catalytic action, particularly when platinum is used as the catalyst.

The invention more particularly relates to and constitutes an improvement of purification and drying processes as are disclosed in U. S. Patents Nos. 940,595 and 1,113,437 to Herreshoff. In such prior processes, the hot gases from the burners are first conducted through suitable dust settling chambers to remove the bulk of the suspended solid particles from the gas stream, and are thence passed through one or more wet cooling towers arranged in series. In the cooling towers, the gases are cooled generally to something less than about 300° F., solid impurities removed from the gases, and the moisture content thereof is materially increased. The temperature of the partially cooled gases is then further reduced by passage through coolers, such for example, as those shown in the later Herreshoff patent. During the passage of the gas through these coolers, the larger portion of the water vapor is condensed, and then withdrawn from the system through suitable outlets in the base of the cooling chambers. At this stage, the gases have been purified to a considerable degree, and most of the moisture has been removed therefrom. The gases in this condition are then conducted into so-called coke filters which effect removal from the gas stream of the sulfuric acid mist. Further quantities of moisture and arsenic contained in the mist are also removed from the gases by the coke filter. From the filter, the gas stream is passed through drying towers in contact with concentrated sulfuric acid to substantially completely dry the gases before permitting the same to pass through the blowers in the gas line and thence into the conversion chambers.

The presence of fluorine as an impurity in burner gases has been known, and the deleterious effect of this substance on catalysts, for example platinum, is also familiar. Several methods and modes of treatment have been proposed looking primarily toward the elimination of fluorine from the burner gases before the latter are conducted into contact with the catalyst. These prior proposals have succeeded in eliminating fluorine and other impurities from the gas stream to a satisfactory extent in many cases. In other cases, however, operation of the system has been found to result in gradual deterioration of the catalyst and the reason therefor has not been appreciated. I have now discovered the gradual deterioration of the catalyst may be attributed in certain cases to the presence of relatively large amounts of fluorine in certain sulphide ores, the fluorine being present in such amount that it is not sufficiently completely removed by the usual wet purification system, and hence passes into the catalyst with resulting poisoning thereof.

The primary object of the present invention is to provide a method for further and substantially complete removal of fluorine from burner gases containing the same and particularly from burner gases containing relatively large amounts of fluorine which are not removed to a sufficient extent by the usual purification methods. According to the present invention, it has been found that burner gases containing fluorine impurities may be dried and simultaneously the fluorine impurities removed therefrom by treating the gases with strong sulfuric acid, and preferably by contacting the gases with sulfuric acid of strength of about 98%.

The treatment of the burner gases with strong acid may be carried out as a separate step, but it has been found that the elimination of fluorine impurities and final drying of gases just prior to the conversion operation may be advantageously combined and effected in a single treatment. Accordingly, in the preferred embodiment of the invention, the gases are dried and substantially all the fluorine impurities removed therefrom by contacting the gases with strong sulfuric acid in a tower such as, for example, the tower P of the Herreshoff Patent 940,595, located in the gas line just ahead of the gas heater and first converter or the blower, if the system be such that blowers are employed in the gas line between the purification train and the converters. Briefly stated, the objects and purposes of the invention may be accomplished by contacting the gases with strong sulfuric acid circulated through a final drying tower such as the tower P disclosed in the earlier of the Herreshoff patents above noted.

As noted, the invention contemplates a treatment with strong sulfuric acid as distinguished from 60–66° Be. sulfuric acid, usually considered as concentrated acid, and weaker acids which have heretofore been used in the drying towers. It is preferred to employ sulfuric acid of a strength of about 98%, or over 98% or an acid of a strength within the range of 97-100%. Substantial improvement toward eliminating fluorine impurities may be attained by employing acid of a concentration of 96%, although an acid weaker than about 95% should not be employed. It is not known why the stronger acid employed in accordance with my invention exerts a strong absorbing effect for fluorine impurities as compared to weaker drying acid but irrespective of the explanation of the phenomena it has been found that the strong acid satisfactorily purifies burner gas of fluorine impurities so that the gas may be subsequently passed to the catalyst without poisoning thereof, whereas, acid of less than 95% strength when used on the same gas did not satisfactorily purify the gas of fluorine impurities and gradual poisoning of the catalyst resulted. Investigations indicate that a hydrofluoric acid content in excess of 0.0000001 gram per cubic foot of gas may cause appreciable poisoning of the catalyst. Hence, the invention is particularly applicable to the treatment of gases containing in excess of 0.0000001 gram hydrofluoric acid per cubic foot.

The tower employed for contacting the gases and the strong acid may be of the usual construction, for example one containing suitable packing through which the gases are passed upwardly in contact with the downwardly flowing acid, the circulation of which through the tower may be maintained by the necessary pumps and piping.

It will be seen that the preferred embodiment of the invention, i. e. where the drying of the acid and the removal of fluorine impurities therefrom are carried out in a single step in a tower in the gas line just ahead of the heaters and converters, provides a process by which a substantially complete removal of fluorine from the gases is effected together with a simultaneous drying of the gases to the necessary degree.

The invention is, of course, not limited for use in conjunction with a purification system such as disclosed in the Herreshoff patents. The present invention may be advantageously employed as a single unit, or as a component part of a more elaborate purification system.

I claim:

1. The method of purifying and drying sulfur dioxide burner gas containing fluorine impurities which comprises contacting the gas with sulfuric acid of over 98% strength, whereby the gas is dried and fluorine impurities removed therefrom.

2. In the method of cooling and purifying hot fluorine containing burner gas in the contact sulfuric acid process involving contacting the gas with sulfuric acid whereby the gas is cooled, solid impurities removed therefrom and the moisture content thereof increased, further cooling the gas and separating moisture and sulfuric acid mist therefrom, the improvement which comprises then contacting the gas with sulfuric acid of over 98% strength, whereby the gas is dried and fluorine impurities removed therefrom.

3. The improvement in the contact process for the manufacture of sulfuric acid in which sulfur dioxide gas containing fluorine impurities is subjected to purification and then contacted with a platinum catalyst, which comprises subjecting the gas as a part of the purification treatment to contact with sulfuric acid of over 98% strength and then passing the gas in contact with the catalyst.

4. The method of purifying and drying sulfur dioxide burner gas containing hydrofluoric acid in excess of 0.0000001 gram per cubic foot which comprises contacting the gas with sulfuric acid of over 98% strength, whereby the gas is dried and fluorine removed therefrom.

JESSE G. MELENDY.